US008963789B2

(12) United States Patent
Chang et al.

(10) Patent No.: US 8,963,789 B2
(45) Date of Patent: Feb. 24, 2015

(54) CONFORMAL HYBRID EO/RF APERTURE

(75) Inventors: Yueh-Chi Chang, Northborough, MA (US); Bradley G. Porter, North Billerica, MA (US); Gregory M. Fagerlund, Peabody, MA (US); Leonard C. Bennett, Groton, MA (US); Thomas V. Sikina, Acton, MA (US); Brandon K. Mui, Lowell, MA (US)

(73) Assignee: Raytheon Company, Waltham, MA (US)

( * ) Notice: Subject to any disclaimer, the term of this patent is extended or adjusted under 35 U.S.C. 154(b) by 541 days.

(21) Appl. No.: 13/206,978

(22) Filed: Aug. 10, 2011

(65) Prior Publication Data

US 2012/0177376 A1    Jul. 12, 2012

Related U.S. Application Data

(60) Provisional application No. 61/373,307, filed on Aug. 13, 2010.

(51) Int. Cl.
| | |
|---|---|
| *H01Q 13/00* | (2006.01) |
| *H01Q 3/12* | (2006.01) |
| *H04B 10/112* | (2013.01) |
| *H01Q 1/28* | (2006.01) |
| *H01Q 1/42* | (2006.01) |
| *H01Q 3/04* | (2006.01) |
| *H01Q 5/00* | (2006.01) |
| *H01Q 13/22* | (2006.01) |
| *H01Q 13/28* | (2006.01) |
| *H01Q 15/24* | (2006.01) |
| *H01Q 21/00* | (2006.01) |

(52) U.S. Cl.
 CPC ............... *H01Q 3/12* (2013.01); *H04B 10/112* (2013.01); *H01Q 1/281* (2013.01); *H01Q 1/425* (2013.01); *H01Q 3/04* (2013.01); *H01Q 5/0013* (2013.01); *H01Q 5/002* (2013.01); *H01Q 13/22* (2013.01); *H01Q 13/28* (2013.01); *H01Q 15/24* (2013.01); *H01Q 21/0031* (2013.01)
 USPC ............ 343/770; 343/754; 343/757; 343/758

(58) Field of Classification Search
 CPC ............ H01Q 3/2676; H01Q 15/0006; H01Q 15/002; H01Q 3/46; H01Q 5/00133; H01Q 15/24; H01Q 13/28; H01Q 21/0031; H01Q 13/203
 See application file for complete search history.

(56) References Cited

U.S. PATENT DOCUMENTS

| | | | |
|---|---|---|---|
| 4,353,769 A | 10/1982 | Lee | |
| 5,126,869 A * | 6/1992 | Lipchak et al. | ............... 349/202 |
| 5,182,564 A | 1/1993 | Burkett et al. | |
| 5,268,680 A | 12/1993 | Zantos | |

(Continued)

OTHER PUBLICATIONS

International Preliminary Report on Patentability for PCT/US2011/047515 dated Feb. 28, 2013.

(Continued)

*Primary Examiner* — Trinh Dinh
(74) *Attorney, Agent, or Firm* — Daly, Crowley, Mofford & Durkee, LLP

(57) ABSTRACT

A conformal hybrid elctro-optical/radio frequency (EO/RF) aperture including an optical phased array (OPA) in a center portion of the aperture, and a variable inclination continuous transverse stub (VICTS) RF antenna surrounding the OPA using a plurality of continuous transverse stub (CTS) subarrays.

22 Claims, 13 Drawing Sheets

(56) References Cited

U.S. PATENT DOCUMENTS

| | | | |
|---|---|---|---|
| 6,060,703 | A | 5/2000 | Andressen |
| 6,816,112 | B1 | 11/2004 | Chethik |
| 6,919,854 | B2 | 7/2005 | Milroy et al. |
| 7,068,235 | B2 | 6/2006 | Guidon et al. |
| 7,109,935 | B2 * | 9/2006 | Saint Clair et al. ........... 343/725 |
| 7,205,948 | B2 | 4/2007 | Krikorian et al. |
| 7,388,551 | B2 | 6/2008 | Guidon et al. |
| 7,656,345 | B2 | 2/2010 | Paschen et al. |
| 8,354,953 | B2 | 1/2013 | Williams |
| 8,581,775 | B2 | 11/2013 | Williams |
| 2004/0233117 | A1 | 11/2004 | Milroy et al. |
| 2006/0017638 | A1 | 1/2006 | Guidon et al. |
| 2006/0033663 | A1 | 2/2006 | Saint Clair et al. |
| 2006/0274987 | A1 | 12/2006 | Mony et al. |
| 2009/0146896 | A1 | 6/2009 | Guidon et al. |
| 2011/0256329 | A1 | 10/2011 | Thomas et al. |
| 2012/0038539 | A1 * | 2/2012 | Chang ........................... 343/872 |
| 2012/0068880 | A1 * | 3/2012 | Kullstam et al. ................ 342/54 |
| 2012/0177376 | A1 * | 7/2012 | Chang et al. .................. 398/115 |

OTHER PUBLICATIONS

PCT Search Report of the ISA for PCT/US2011/047515 dated Apr. 27, 2012.

Written Opinion of the ISA for PCT/US2011/047515 dated Apr. 27, 2012.

Brookner, "Phased Arrays Around the World—Progress and Future Trends;" IEEE 2003 International Symposium on Phased Array Systems and Technology; Oct. 14-17, 2003; pp. 1-8.

International Search Report of the ISA for PCT/US2011/047514 dated Aug, 20, 2013, 6 pgs.

Written Opinion of the ISA for PCT/US2011/047514 dated Aug. 20, 2013, 8 pgs.

Notification Concerning Transmittal of International Preliminary Report on Patentability (Chapter 1 of the Patent Cooperation Treaty), PCT/US2011/047514, dated Sep. 26, 2013, 1 page.

International Preliminary Report on Patentability, PCT/US2011/047514, dated Sep. 17, 2013, 1 page.

Written Opinion of the International Searching Authority, PCT/US2011/047514, dated Aug. 20, 2013, 7 pages.

DesAutels et al.; "Research and Development of an Integrated Electro-Optical and Radio Frequency Aperture;" Oct. 14, 2003; pp. 1-9.

Raytheon Company; "VICTS Antenna;" data sheet; www.raytheon.com/capabilities/products/victs/; printed Jul. 30, 2010; 3 sheets.

"Schafer Lightweight Optical Systems (LWOS)"; www.nmoia.org/images/Schafer_lwos_brochure; Aug. 1, 2010; pp. 1-28.

Sikina et al.; "Variably Inclined Continuous Transverse Stub-2 Antenna;" 2003 IEEE International Symposium on Phased Array Systems and Technology; Oct. 14-17, 2003; pp. 435-440.

Thinkom Solutions, Inc.; The Variable Inclination Continuous Transverse Stub (VICTS) Array; data sheet; www.thin-kom.com/pdf/NonPropVICTSWP; Aug. 1, 2010; 2 sheets.

Quayle Action dated May 8, 2014 corresponding to U.S. Appl. No. 13/191,596; 11 Pages.

* cited by examiner

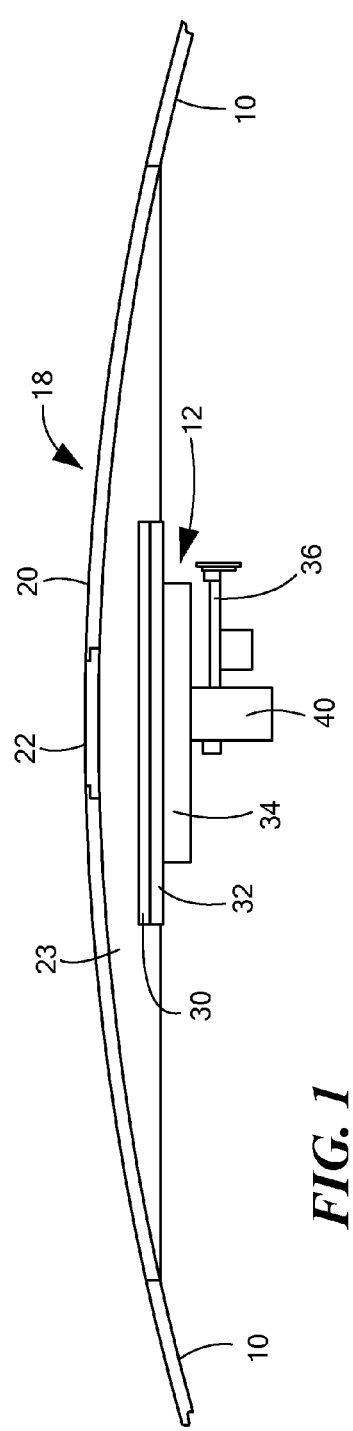
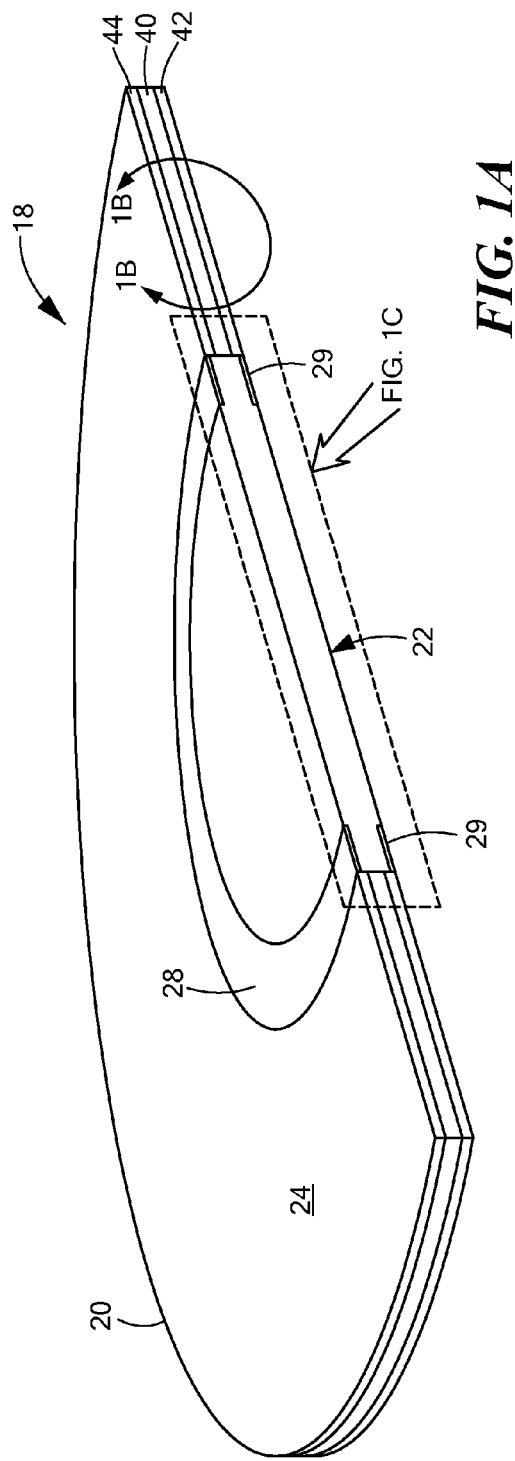

CONFORMAL HYBRID EO/RF APERTURE

CROSS REFERENCE TO RELATED APPLICATION

This application claims the benefit of U.S. Provisional Application No. 61/373,307 filed Aug. 13, 2010 under 35 U.S.C. §119(e) which application is hereby incorporated herein by reference in its entirety.

FIELD OF THE INVENTION

The system and techniques described herein relate generally to antennas and optical phased arrays, and more particularly to a conformal hybrid electro-optical/radio frequency (EO/RF) aperture.

BACKGROUND OF THE INVENTION

As is known in the art, there is a need for transferring relatively large amounts of data (>1 Gb/sec) between satellite/sensors, unmanned aerial vehicle (UAVs), aircrafts, ships and ground. Potential applications include airborne networking backbone for GIG extension and US Navy high data rate reach-back for military, downloading of satellite gathered data for NASA/NOAA, and border monitoring or disaster recovery communications for homeland security.

To satisfy the requirements of such disparate applications, it is necessary to have a hybrid elctro-optical/radio frequency (EO/RF) aperture (HERA) that combines electro-optics (EO) and RF circuitry in a common aperture. This approach saves real estate and simplifies pointing and tracking algorithms. Furthermore, it is desirable for the HERA aperture to be conformal to a fuselage of an aircraft or unmanned aerial vehicle (UAV) or other body. In aircraft applications, conformal antennas reduce drag and volume.

Prior attempts to provide a HERA include systems such as that manufactured by Mission Research Corporation (MRC). The MRC approach comprises an RF horn having an optical beam disposed through a sidewall of the horn. Such a system can provide a common mechanical motion for both EO and RF that are co-boresight. Another prior art system manufactured by Schaeffer includes a 50 cm optical telescope disposed on a reflector of a Global Hawk Ku-band communications reflector antenna. This approach also provides a common mechanical motion for both EO and RF that are co-boresight. Both of the above systems have common EO/RF apertures. However, neither system is conformal and both require significant volume.

U.S. Pat. No. 7,388,551, describes multiple variable inclination continuous transverse stub (VICTS) antennas (generally described as outer and middle VICTS antenna) which provide simultaneous communication with multiple remote sites. However, in the structure described in the '551 patent, non-radiating RF conductors are required to connect the stubs separated by the middle VICTS antenna(s). Special care of routing the conductors around the middle VICTS antennas is needed since each VICTS antenna is rotating in the azimuth plane.

It would, therefore, be desirable to provide to a conformal, a hybrid electro-optic/radio frequency (EO/RF) system having a common RF/EO aperture which requires a relatively small volume.

SUMMARY OF THE INVENTION

In accordance with the concepts, systems and techniques described herein, an antenna comprises a variable inclination continuous transverse stub (VICTS) antenna having a block-out aperture in a portion thereof and an optical phased array (OPA) disposed in that block-out aperture of the VICTS antenna.

With this particular arrangement, a hybrid elctro-optical/radio frequency aperture (HERA) RF antenna design is provided which utilizes an outer aperture of a dual-aperture variable inclination continuous transverse stub (VICTS) configuration. The dual-aperture HERA comprises a first aperture which operates in a first band of the electromagnetic spectrum surrounding a second aperture which operates in a second band of the electromagnetic spectrum where the first band is lower than the second band. In one embodiment, the first aperture is an RF aperture made up from a plurality of RF subarrays (in one embodiment, four subarrays) and the second aperture is an optical aperture (which, in one embodiment, is an optical phased array (OPA)). In one embodiment, the block-out aperture is in a central portion of the VICTS antenna and an optical phased array (OPA) is disposed in that block-out aperture of the VICTS antenna.

It should be appreciated that for other applications, the second aperture could be provided as another VICTS antenna, or any other EO or RF aperture.

In one embodiment, the VICTS RF antenna comprises a plurality of continuous transverse stub (CTS) subarrays which surround the OPA. In one embodiment, four CTS subarrays are used.

In the embodiment described herein, no conductor connection between the stub is needed using the innovative subaperture approach described herein. This is in contrast to the approach described in U.S. Pat. No. 7,388,551.

In one embodiment, the low-band aperture is capable of steering an RF beam about fifty (50) degrees in any elevation direction without using a conventional elevation-over-azimuth gimbal. The hybrid system described herein allows the OPA to be located in the middle of the HERA and rotated together in azimuth with a common turntable.

In one embodiment, the VICTS antenna includes a plurality of continuous transverse stub (CTS) subarrays, a slot plate disposed over the plurality of CTS subarrays and rotatable with respect to a surface formed by the plurality of CTS subarrays, a polarizer disposed over the slot plate; and a plurality of power dividers coupled to the plurality of CTS subarrays.

In one embodiment, four CTS subarrays are used. The four subarray aperture configuration surrounds the OPA while also providing optimized RF performance (optimized in terms of aperture efficiency and good impedance match for wide angle scan). This configuration makes it possible for the RF aperture and OPA to have a common azimuth rotation axis and could be rotated using a common azimuth turntable. It also avoids loss of RF energy in the blockage area occupied by the OPA.

In one embodiment, the subarrays have a rectangular shape and comprise slow-wave corrugations. The slow-wave corrugations of the rectangular subarrays coupled to the radiating slots of an upper rotating slot plate provide the antenna having improved, and in some cases optimized, antenna efficiency. The radiating slot design is optimized for two different slow-wave structures. In one embodiment, the antenna comprises a radome disposed over the VICTS antenna. The radome has an opening therein to expose the OPA.

BRIEF DESCRIPTION OF THE DRAWINGS

The foregoing features of the concepts, circuits, systems and techniques described herein, may be more fully understood from the following description of the drawings in which.

DETAILED DESCRIPTION OF THE PREFERRED EMBODIMENTS

Figure 1B:
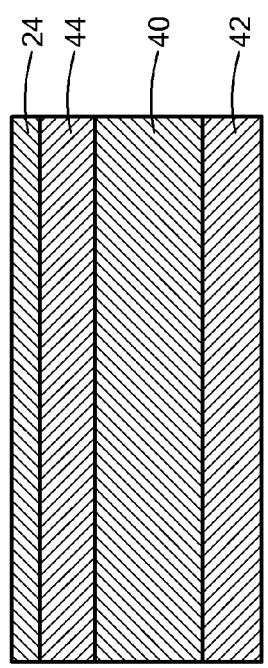
FIG. 1 is a front view of a conformal hybrid electroptic/radio frequency (EO/RF) aperture.

Referring now to FIG. 1, a body 10 has an opening therein in which is disposed a conformal hybrid electro-optic/radio frequency (EO/RF) aperture (HERA) 12.

Body 10 may correspond, for example, to a fuselage or other portion of an aircraft or unmanned aerial vehicle (UAV) or to a portion of a ground based vehicle, such as a truck or to a portion of a ship or a ground based station or other ground-based, air-based or water-based body.

Hybrid EO/RF aperture 12 is provided from a variable inclination continuous transverse stub (VICTS) antenna 14 having an aperture in a central portion thereof in which is disposed an optical phased array (OPA) 16. An integrated window 18 is disposed over the VICTS antenna. Integrated window 18 includes an RF radome portion 20 and an optical window portion 22 which together provide window 18 as an integrated window 18. An OPA signal can only pass through optical window but not the RF radome. It should be noted that the OPA aperture is significantly smaller than the VICTS antenna aperture, so the size of the optical window is chosen to cover the maximum scan angle of the OPA plus some margin. On the other hand, this design is such that RF energy can pass through both the optical window and the RF radome portion (including the transition portion between the RF radome and optical window) without much discontinuity.

Figure 1C:
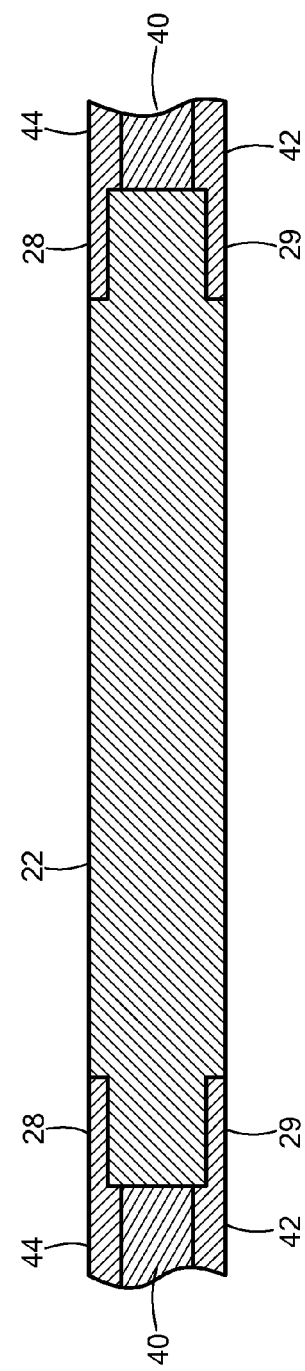

Referring now to FIGS. 1-1C, the thickness of RF radome portion 20 is selected to be substantially the same as the thickness of the optical window portion 22, which is chosen to optimize the RF performance, including low RF insertion loss and a reduced (or in some cases even minimal) axial ratio degradation. Also, the radome is provided having a thickness such that it can meet vibration and other environmental and mechanical requirements. Thus, in practical applications, a minimal thickness of integrated window 18 is determined by a number of factors including, but not limited to, the ability to withstand an environment to which the integrated window 18 will be exposed.

As mentioned above, in the exemplary embodiment shown in FIG. 1, hybrid electro-optic/radio frequency (EO/RF) aperture 12 is provided from a variable inclination continuous transverse stub (VICTS) antenna 14 having an aperture in a central portion thereof in which is disposed an optical phased array (OPA) 16.

Integrated window 18 includes RF radome portion 20 provided from material that is suitable (i.e. electrically transparent) to a range of radio frequency (RF) signals of interest and optical window portion 22 embedded within the RF radome portion, with the optical window portion being provided from an optically transparent material. Thus, integrated window 18 is transparent to both RF and optical signals.

In one embodiment, RF radome portion 20 corresponds to an RF radome provided from a composite material which is substantially transparent to signals in a desired range of RF frequencies. In one embodiment, the composite material is provided from a mix of epoxy/quartz and epoxy/fiberglass. In the embodiment shown in FIGS. 1 and 1B, an environmental coating 24 (e.g. a layer of paint or other suitable coating) is disposed on an external surface of RF radome portion 20 to provide environmental protection. It should be noted that environmental coating 24 layer is typically relatively thin (e.g. on the order of 0.002" to 0.005"), and thus, to promote clarity in the drawings, is not shown in FIGS. 1A and 1C.

In the embodiment shown in FIGS. 1 and 1A, optical window portion 22 is provided as a substantially flat, fused silica window 22 embedded in the RF radome 20. By making RF radome portion 20 from a composite material, the RF radome portion can be provided (but need not be provided) having a curved surface. Thus, the RF radome portion can be used in applications which require a curved surface or in applications which require a substantially flat surface.

The curved radome surface can be provided using one of a plurality of different techniques including, but not limited to; laying up using pre-impregnated (or more simply "pre-preg") layers; molding; machining; or forming. Thus, the integrated window can be provided having a shape which matches the shape of a flat or a curved surface (i.e. a so-called conformal shape).

Furthermore, the integrated window 18 improves, and in some cases even optimizes, electro-optical (EO) and RF performance of a HERA while also making it possible for the HERA to be conformal to a body such as the fuselage (or other portion) of an aircraft, an unmanned aerial vehicle (UAV), a ship or a ground based station or other ground-based, air-based or water-based body or other structure or body.

For cost considerations, in some embodiments, the optical window portion of the integrated window can be provided as a relatively small, flat, window which is appropriately polished for optical communications. The thickness of the optical window is selected to provide acceptable, and in some cases optimized, RF performance within a desired RF band while still providing the integrated window having a desired structural strength.

Referring briefly to FIG. 1B, the RF radome portion 20 of integrated window 18 may be made of a mix of epoxy/quartz 42, 44 disposed on either side of an epoxy/fiberglass 40 to provide a composite material. An environmental coating layer 24 (e.g. a layer of paint or other suitable material) is disposed on an outside surface of epoxy/quartz layer 44 for environmental protection. Solid laminate construction provides the structural strength required by the integrated window and the use of composite material allows the integrated window to have a curved geometry. This allows the integrated window to be conformal to an aircraft fuselage (or other aircraft portion) or UAV fuselage (or other UAV portion).

The materials from which integrated window 18 is provided are selected such that the RF radome 20 and the optical window 22 have substantially the same physical thickness as well as substantially the same electrical wavelengths at a desired RF band. This approach reduces, and in some cases may even minimize, insertion loss and phase distortion of RF signals and allows the HERA 12 to achieve substantially optimal RF performance, especially when an RF beam (e.g. provided by a VICTS antenna) is scanned to a direction where the RF beam passes through both RF radome 20 and optical window 22.

The integrated window 18 also includes areas 28, 29 (FIG. 1A) on first and second opposing surfaces of optical window 22 in which an overlap of optical window 22 and RF radome 20 exists. Areas 28, 29 correspond to joining regions (i.e. regions of integrated window 18 in which RF radome 20 and optical window 22 are physically joined.

In one exemplary embodiment, the thickness of optical window 22 is reduced (e.g. by a machining operation, for example) by an amount approximately equal to two (2) to four (4) plies of an epoxy/quartz pre-preg material. In one embodiment each ply is in the range of about 5-15 mils with plies in the range of 10-11 mils being preferred for operation in the RF frequency range of about 14.4-15.4 GHz. The plies of pre-preg epoxy/quartz are disposed over portions of optical window 22 to form a sandwich structure with a portion of the optical window (i.e. the portion having a slightly reduced thickness in the overlap region 28) forming the core of the sandwich. To join the RF radome portion and the integrated window one may use a standard composite manufacturing process during which pre-preg layers are cured and glued together in an oven or autoclave by heat and pressure.

In one embodiment, overlap regions 28, 29 are each provided as a 0.25 inch wide ring along the outside edge of the optical window 22. This approach provides a technique to transition between the RF radome portion 20 and the optical window portion 22 and facilitates manufacturing of the integrated window 18.

With the above embedded ring approach, an integrated conformal RF radome and optical window can be provided having a desired physical and electrical thicknesses. This can be achieved by properly selecting two composite materials with a first one of the materials having a relative dielectric constant which is lower than the relative dielectric constant of the optical window and a second of the materials having a relative dielectric constant which is higher than the relative dielectric constant of the optical window. In one embodiment in which the optical window is provided from fused silica, the first material may be provided as epoxy/quartz (which has lower dielectric constant lower than fused silica), and the second material may be provided as epoxy fiberglass (which has higher dielectric constant than fused silica) Furthermore, the thickness ($T_L$ for lower dielectric constant $E_L$, and $T_H$ for higher dielectric constant $E_H$) of the composite material need to be derived from the following two linear equations. The first equation is to ensure substantially the same physical thickness and the second equation is to ensure similar electrical thickness from RF performance point of view.

$$T_L + T_H = T_O$$

$$T_L \cdot \eta_L + T_H \cdot \eta_H = T_O \eta_O$$

where $T_O$ and $E_O$ are the thickness and the dielectric constant of the optical window, respectively, which are pre-determined. $\eta_O$ is the index of refraction of the optical window, which is equal to the square root of the dielectric constant $E_O$. Similarly, $\eta_L$ is equal to the square root of the relative dielectric constant $E_L$, and $\eta_H$ is equal to the square root of the relative dielectric constant $E_H$.

This technique results in a transition between the RF radome and optical window which substantially maintains the same physical and electrical thickness and allows the optical window to be embedded in the RF radome.

Figure 2:
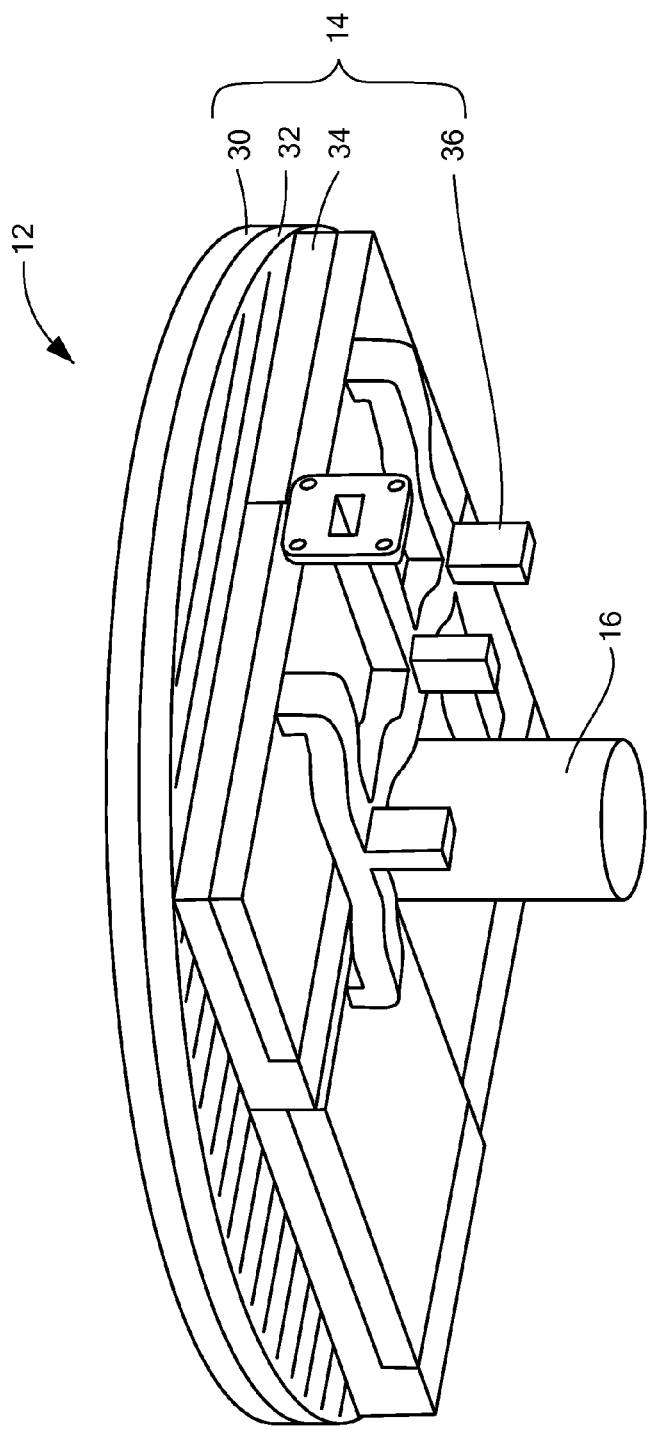
FIG. 2 is an isometric bottom view of a conformal hybrid electroptic/radio frequency (EO/RF) aperture.
Figure 3:
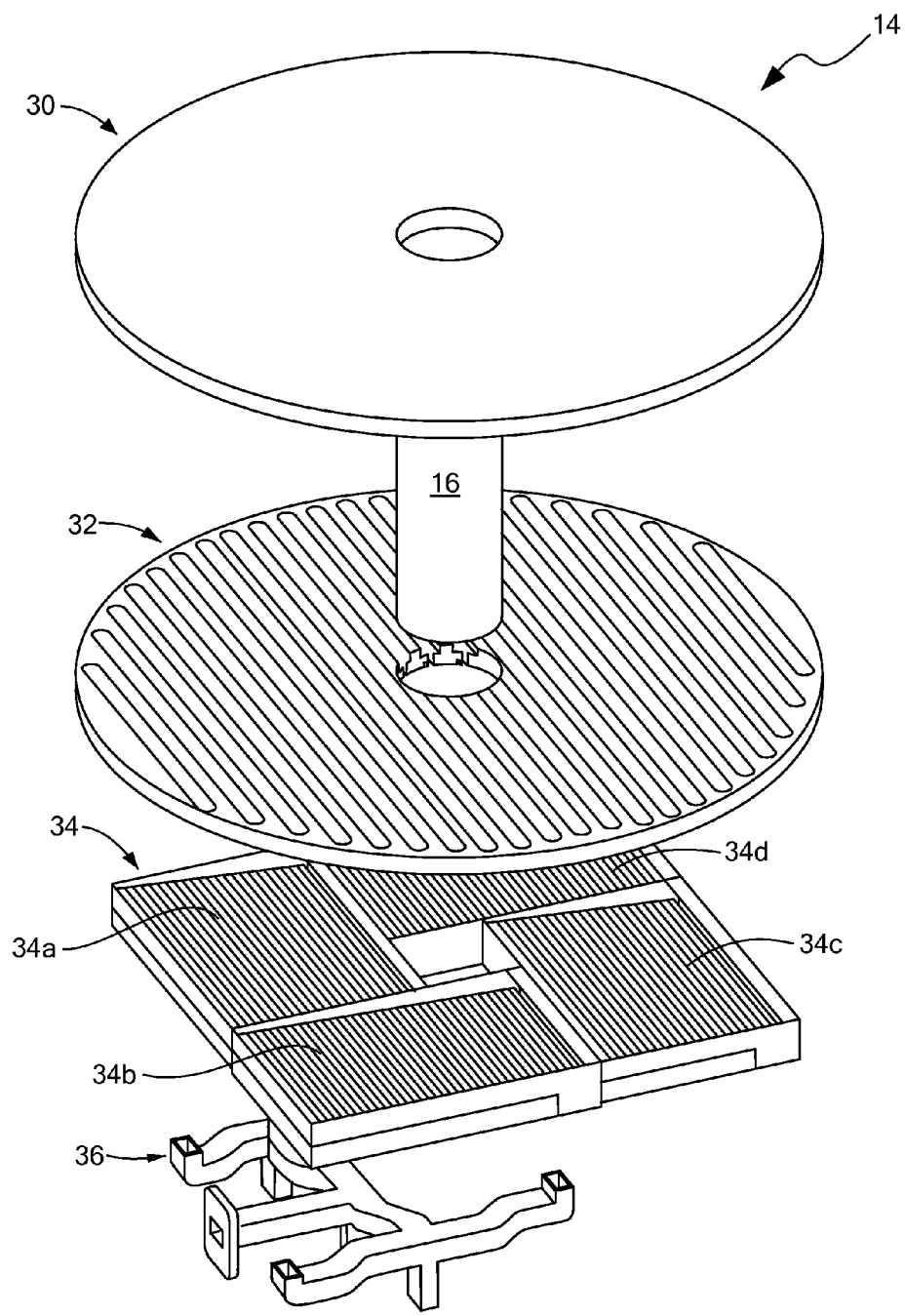
FIG. 3 is an exploded isometric view of a conformal hybrid electroptic/radio frequency (EO/RF) aperture.

Referring now to FIGS. 2 and 3 in which like elements of FIG. 1 are provided having like reference designations, throughout the several views, VICTS 14 is provided from a polarizer 30 which is disposed over a first surface of a slot plate 32. Slot plate 32, in turn, is disposed over a continuous transverse stub (CTS) subarray plate 34 comprised of portions 34a-34d. A power divider network 36 is coupled to the CTS subarray plate 34. OPA 16 is disposed in a central opening provided in polarizer 30, slot plate 32, subarray plate 34 and power divider 36.

The polarizer and slot plate are coupled to rotate together to scan in elevation. The entire hybrid EO/RF aperture 12 and OPA 16 rotate in azimuth together.

In one embodiment (and as will be described in detail below in conjunction with FIG. 6), CTS subarray plate 34 comprises four (4) subarrays 34a-34d, each of which surrounds OPA 16 and each of which is coupled to slot plate 32. It should, of course, be appreciated that in other embodiments CTS subarray plate 34 may comprise fewer or more than 4 subarrays.

In one embodiment, power divider network 36 (here implemented as a waveguide power divider network) is provided from a plurality of power dividers. In the case where subarray plate 34 comprises four (4) subarrays, power divider network 36 is provided from one 1:4 power divider, two 1:6 power dividers and two 1:9 power dividers. In this embodiment, the power dividers are selected to provide a uniform amplitude distribution across the CTS apertures 34a-34d. In other embodiments, other amplitude distributions may, of course, also be used.

Figure 4:
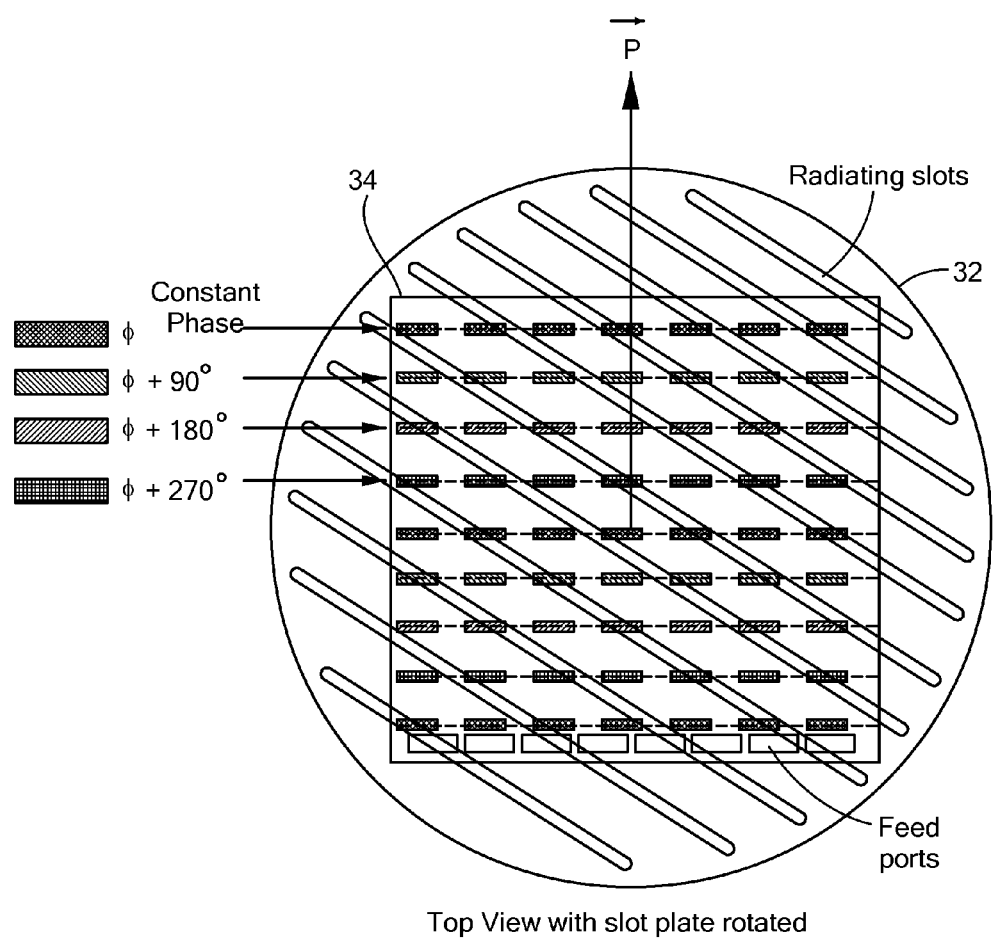
FIG. 4 is a top view of top slot plate rotated over a feeding plate that includes feed ports from one end and a slow-wave structure such as a corrugated surface to allow coupling of energy into the slots.

Referring now to FIG. 4, slot plate 32 is disposed over CTS subarray plate 34. A parallel plate mode in the P direction generates constant phase fronts shown as cross-hatched lines. When the slot plate is rotated with respect to feed ports in the subarray, as shown in FIG. 4, energy is coupled to the radiating slots with a linear phase taper across each slot to cause the main beam to scan.

Figure 5:
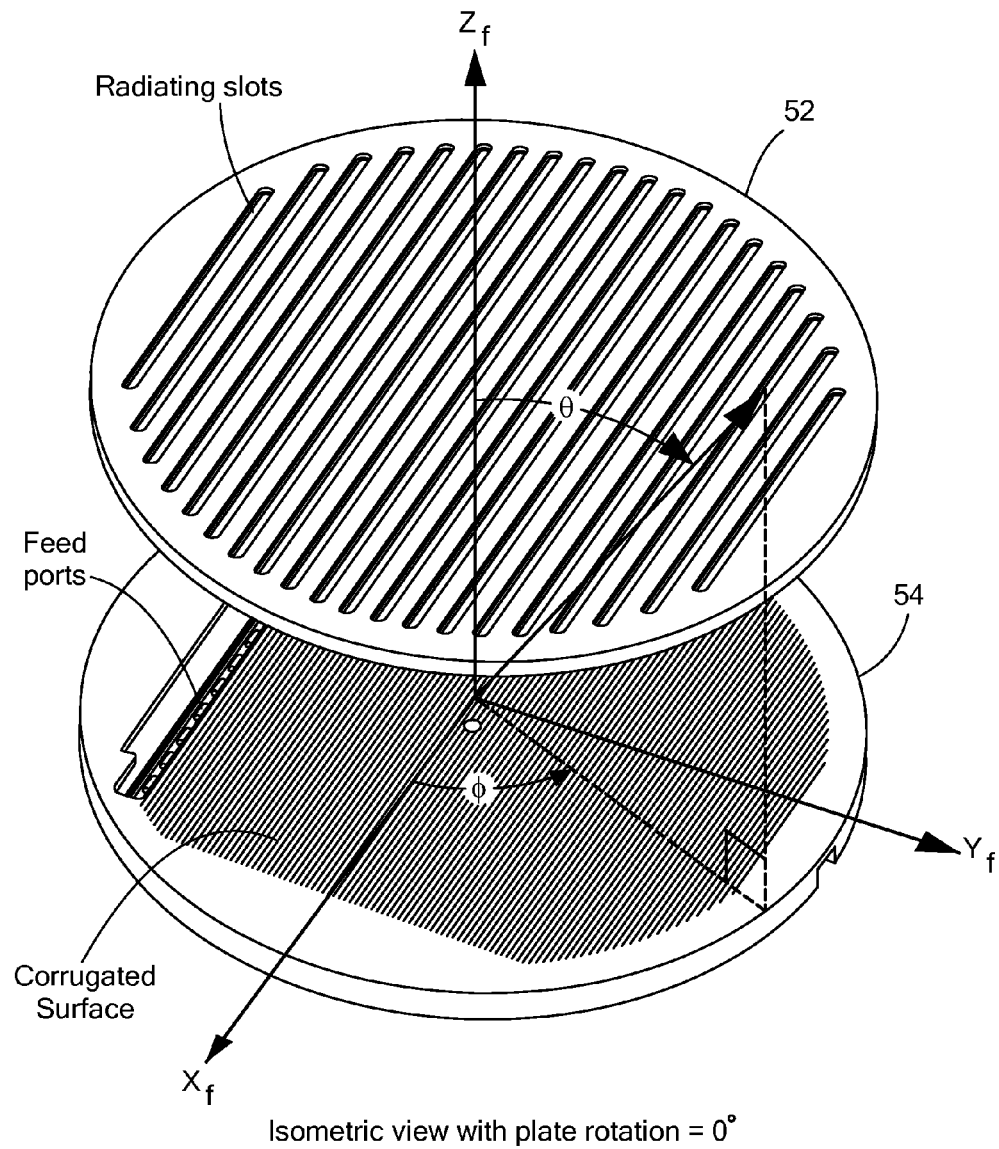
FIG. 5 is an exploded isometric view of a slot plate disposed over a corrugated surface.
Figure 6:
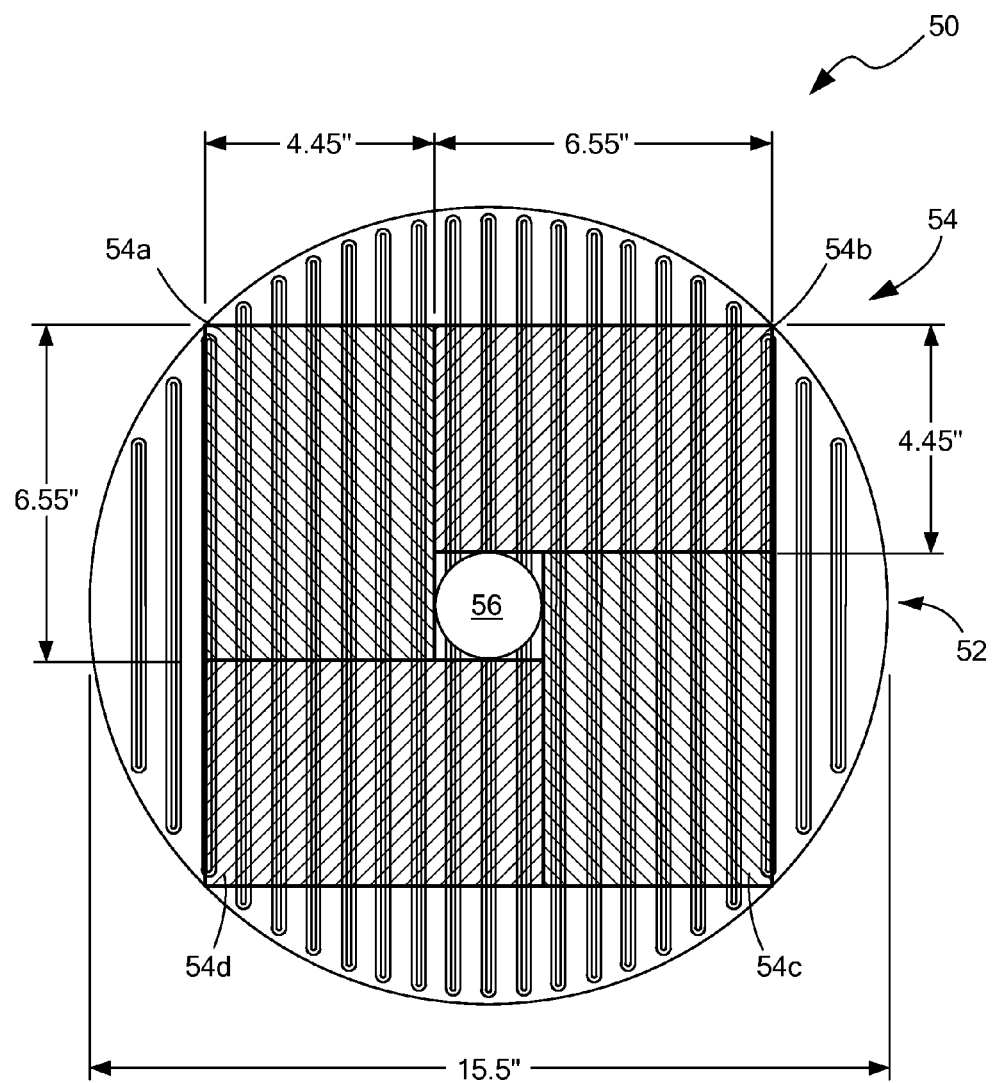
FIG. 6 is a top view of a slot plate with the layout of four RF subarrays to form an open aperture area for an optical phased array (e.g. in which an optical phased array may be disposed)

Referring now to FIGS. 5 and 6 in which like elements are provided having like reference designations, slot plate 52 is disposed over CTS subarray plate 54. As may be most clearly seen in FIG. 6, a hybrid EO/RF aperture 50 includes a single VICTS antenna with four (4) subarrays surrounding an OPA 56. Two subarrays are provided as six (6) slot subarrays having a rectangular shape and having a length of about 4.45" and a width of about 6.55" and two subarrays are provided as nine (9) slot subarrays having a rectangular shape and having a length of about 6.55" and a width of about 4.45." The subarray is provided having an overall diameter of about 15.5." The frequency of operation for this design is in the range of about 14.4 GHz to about 15.4 GHz. The rotating slot plate 32 is disposed on top of the CTS subarrays 54a-54d. With this configuration, the power divider network is provided from a single 1:4 power divider and two 1:6 and 1:9 power dividers.

Figure 7:
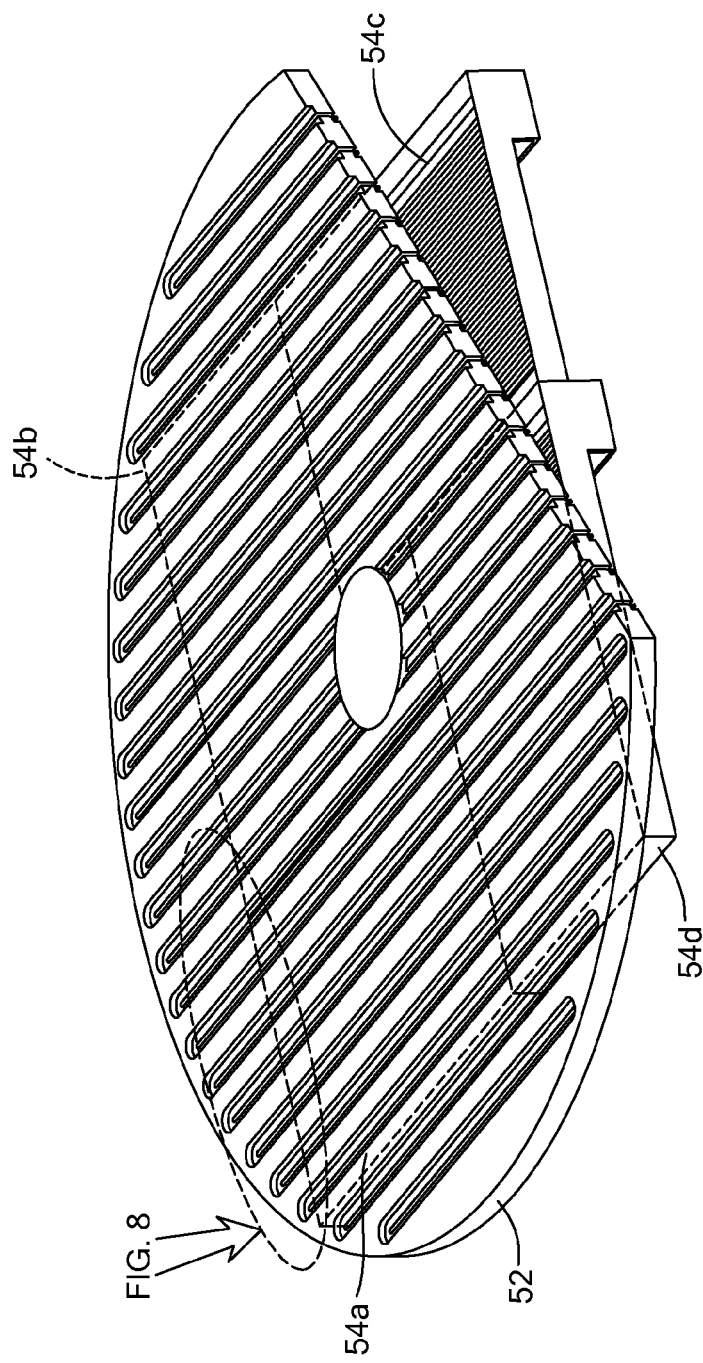
FIG. 7 is an isometric view of an optical phased array disposed in an RF slot subarray.
Figure 8:
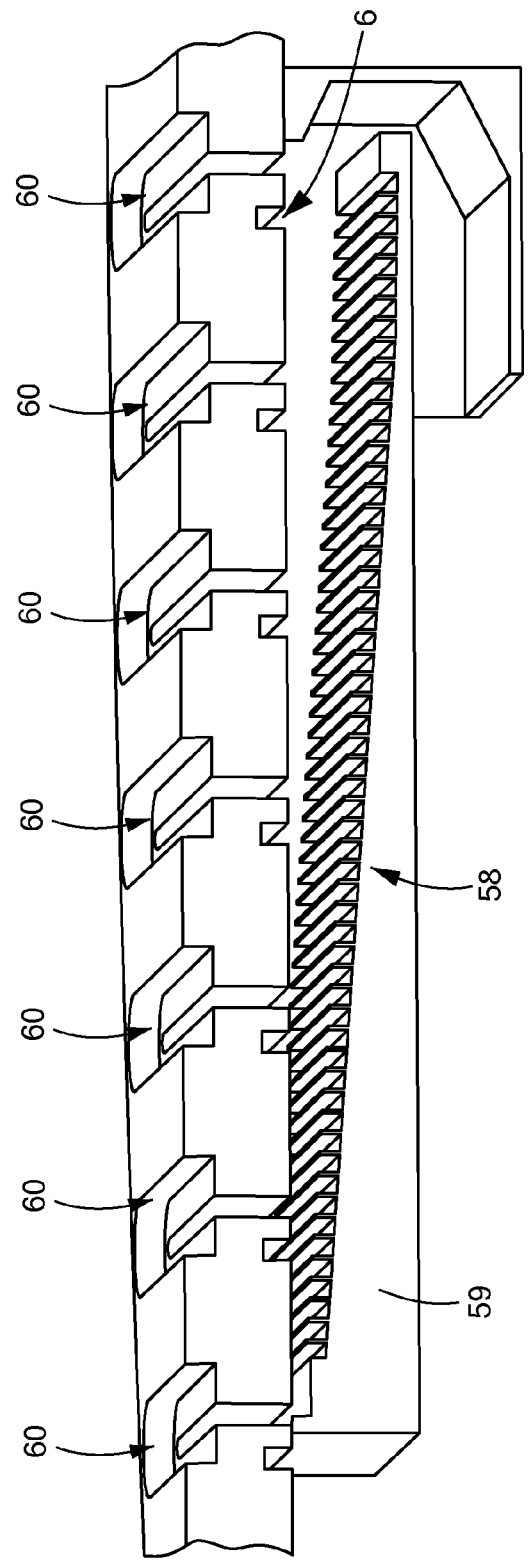
FIG. 8 is a cross-sectional view of a portion of a variable inclination continuous transverse stub (VICTS) antenna disposed in an RF six-slot subarray taken across lines 8-8 in FIG. 7.

Referring now to FIGS. 7 and 8 in which like elements are provided having like reference designations, the slot subarray comprises a tapered corrugated surface 58 having a corrugation depth, width and wall thickness selected to slow down the parallel plate wave to allow energy coupling into the transverse slots 60. The tapered bottom plate 59 is designed such that the spacing between the corrugated plate 58 and the transverse slots 60 is reduced as the wave propagating along the corrugated plate 58. This is necessary to increase coupling coefficient to radiated slots, in order to compensate for the reduction of energy due to coupling to previous slots. With this, an almost uniform radiation through the subarray aperture can be achieved.

As can be clearly seen in FIG. 8, the antenna further comprises matching stubs 61 which are provided to improve impedance matching between the feed and the free space through the transverse slots 60.

In this exemplary embodiment, corrugated plate 58 is used to slow down the wave propagation. Note that one could also use dielectric loading instead of corrugation to slow down the wave. Tapered plate 59 is necessary to reduce separation and increase coupling coefficient. Transverse slots 60 allow for the coupling and radiation of the energy and matching slots 61 are needed to improve impedance matching between the parallel plate wave and the transverse slots 60 coupling and radiation. With an optimized design of these components, maximum energy could be radiated into free space with almost uniform distribution over the subarray aperture.

Figure 9:
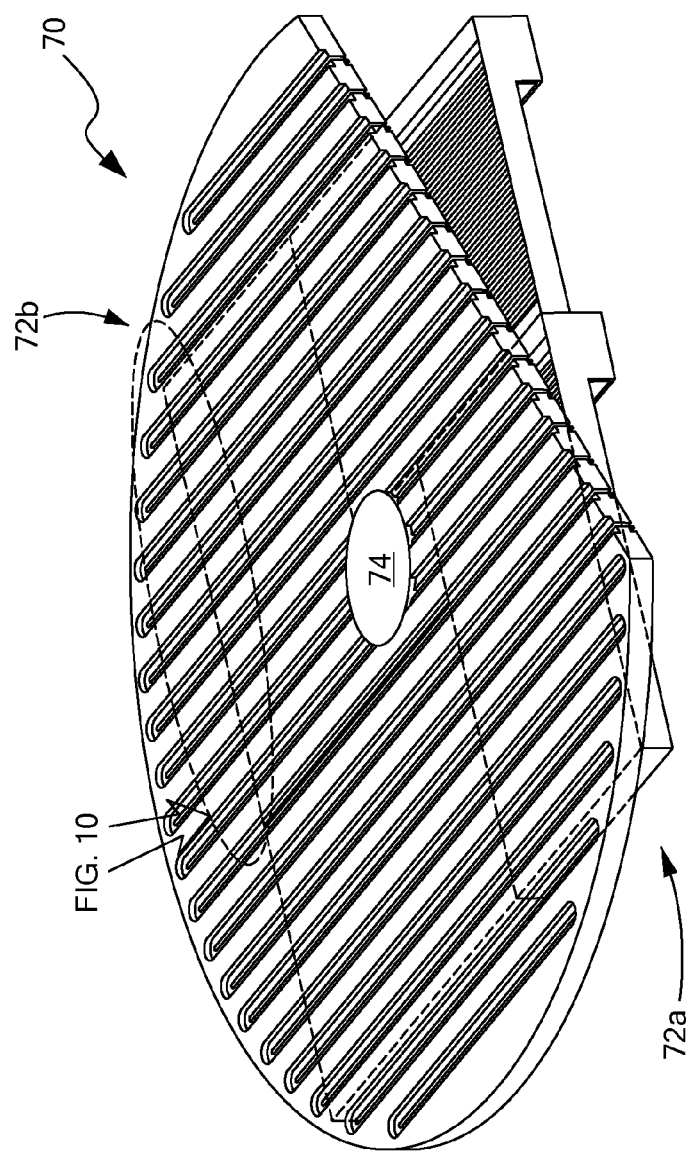
FIG. 9 is a perspective view of an optical phased array disposed in an RF nine-slot subarray.
Figure 10:
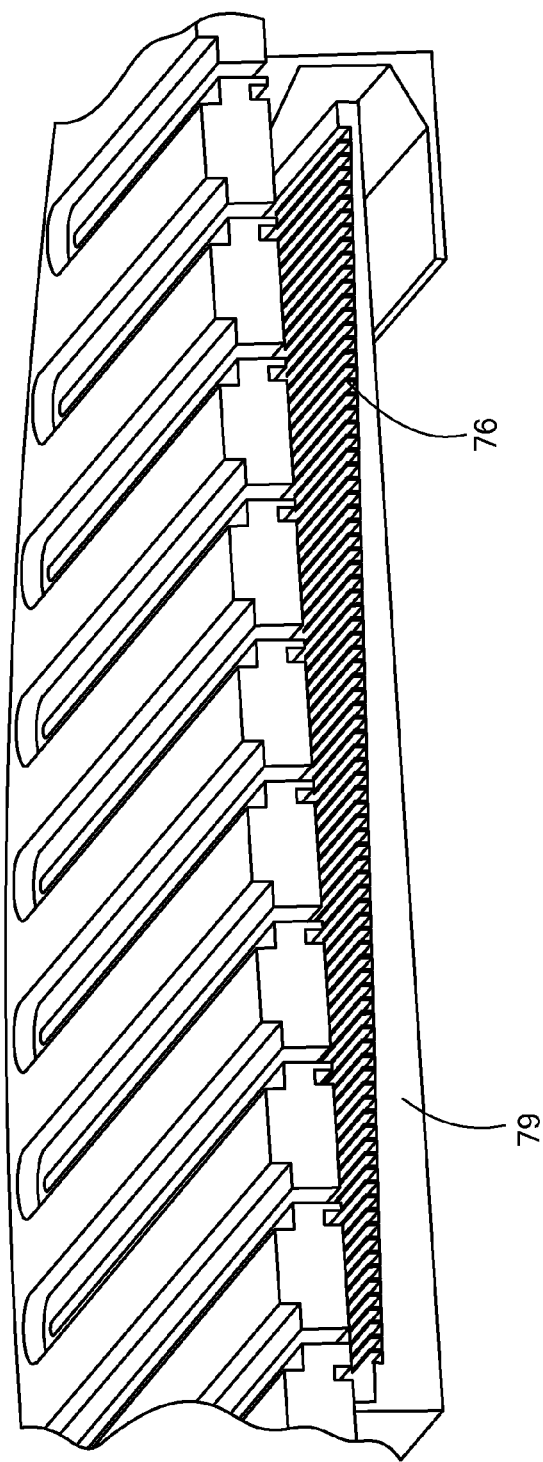
FIG. 10 is a cross-section view of a portion of the VICTS antenna disposed in the RF nine-slot subarray taken across a portion of FIG. 9.

Referring now to FIGS. 9 and 10 in which like elements are provided having like reference designations, a hybrid EO/RF aperture 70 includes a single VICTS antenna with two (2) nine (9) slot subarrays 72a, 72b surrounding an OPA 74.

As can be clearly seen in FIG. 10, the antenna further comprises corrugations 76 on a tapered plate 79 with the same matching stubs 61 to improve impedance matching and the same transverse stubs 60.

Figure 11:
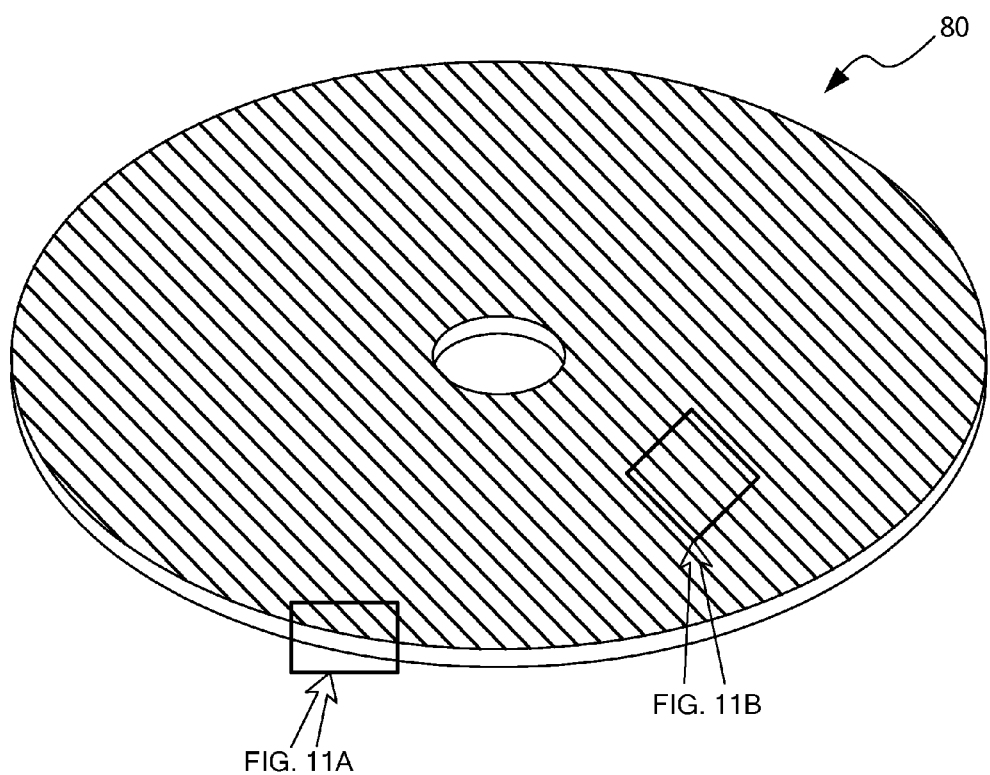
FIG. 11 is an isometric view of a polarizer.
Figure 11A:
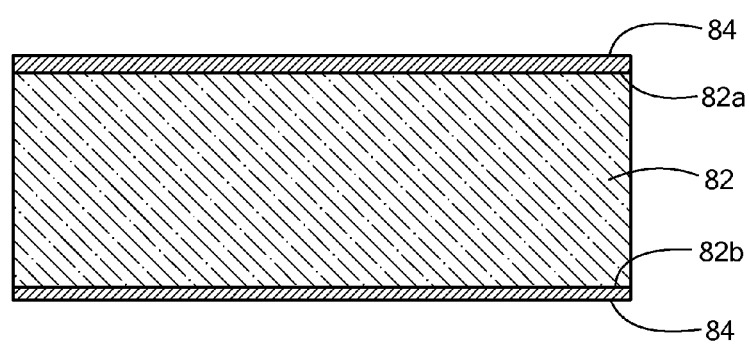
FIG. 11A is an expanded cross-sectional view taken through lines 11A-11A of the polarizer of FIG. 11.
Figure 11B:
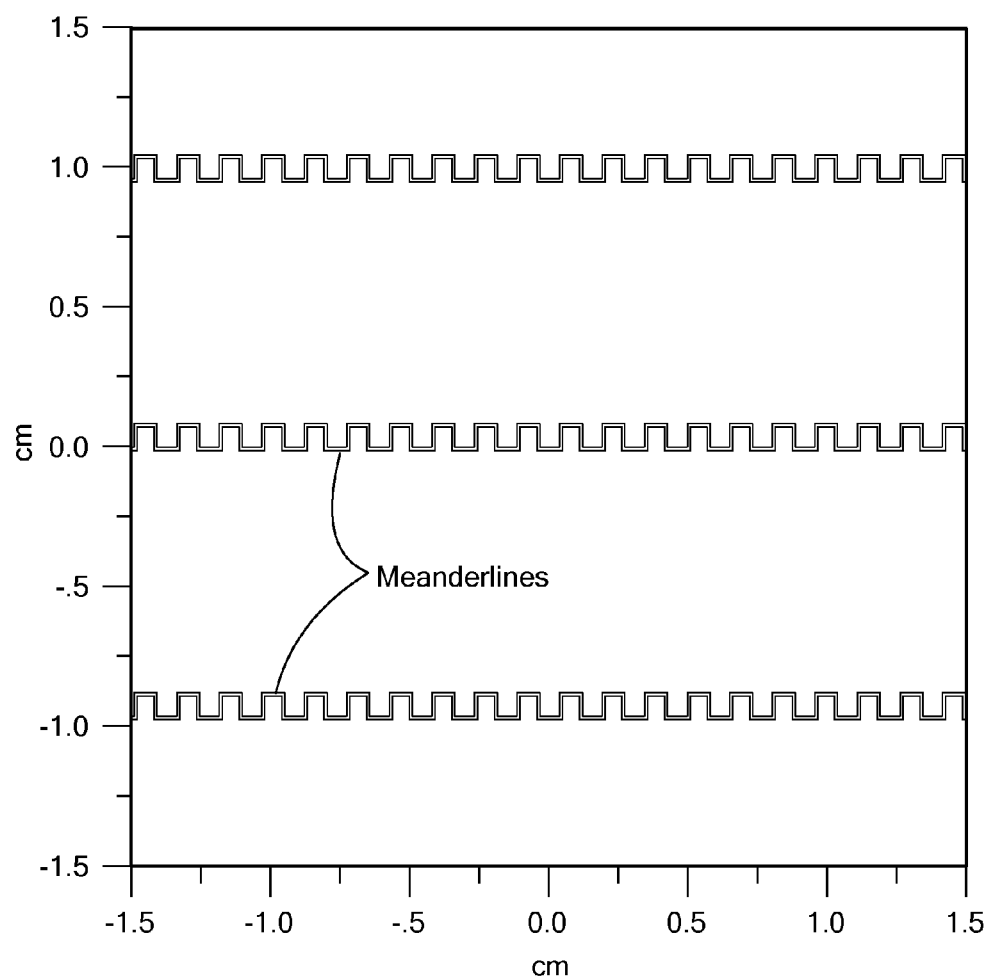
FIG. 11B is an expanded top view taken along lines 11B-11B of the polarizer of FIG. 11.

Referring now to FIGS. 11-11B in which like elements are provided having like reference designations throughout the several views, a polarizer 80 includes a foam substrate 82 (FIG. 11A) bonded with two outer skins of a polyimide film 84 (e.g. Kapton® manufactured by E. I. Du Pont De Nemours And Company Corporation Delaware 1007 Market St. Wilmington Del.), having meanderline circuits (or more simply, "meanderlines") 82a and 82b printed on the inside surfaces of the polyimide film layers 84. In one embodiment, the polyimide film is provided from Kapton® having a thickness of about 0.003" (although those of ordinary skill in the art will appreciate that other films having similar electrical and mechanical characteristics may be used) and the foam substrate is provided having a thickness of about 0.35". The thicknesses are selected for an embodiment operating in a frequency range of about 14.4 GHz-15.4 GHz. Foam material could be those from General Plastics or Airex with low relative dielectric constant between 1.05 and 1.1. Note that one could also use low density honeycomb material such as Nomex HRH-10. In other embodiments, Kapton skins could be replaced with thin composite layers such as Quartz/Cyanate Ester pre-preg layers.

In one embodiment, the foam substrate is disposed with respect to said slots such that a centerline of the meanderlines is disposed at an angle of about 45 degrees with respect to said slots. This is done to convert the linear-polarized energy out of the slots into circularly-polarized field.

Having described preferred embodiments which serve to illustrate various concepts, structures and techniques which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims.

What is claimed is:

1. An antenna comprising:
a variable inclination continuous transverse stub (VICTS) antenna having a central opening, a plurality of continuous transverse stub (CTS) subarrays, a slot plate disposed over said plurality of CTS subarrays and rotatable with respect to a surface of said CTS subarrays, and a plurality of power dividers coupled to said CTS subarrays;
an optical phased array (OPA) disposed in the central opening of said VICTS antenna; and
a polarizer disposed over said VICTS antenna, said polarizer having an opening therein to expose the OPA.

2. The antenna of claim 1 wherein said plurality of CTS subarrays comprise four subarrays surrounding the OPA.

3. The antenna of claim 2 wherein at least one of said CTS subarrays has six slots and at least one of said subarrays has nine slots.

4. The antenna of claim 1 wherein said plurality of power dividers comprise:
a 1:4 power divider;
two 1:6 power dividers; and
two 1:9 power dividers.

5. The antenna of claim 1 wherein said slot plate comprises a tapered corrugated surface having a shape selected to slow down a parallel plate wave and to increase coupling to radiated slots.

6. The antenna of claim 5 further comprising stubs added to improve impedance matching between the feed and the free space through the slots.

7. The antenna of claim 6 wherein said polarizer comprises:
a foam substrate and two skin layers; and
meanderline circuits printed on the inside of each of the skin layer.

8. The antenna of claim 7 wherein said polarizer is disposed with respect to said slots such that a centerline of said meanderlines is disposed at an angle of 45 degrees with respect to said slots.

9. The antenna of claim 7 wherein said polarizer comprises dielectric skins disposed over the foam layer and said meanderline circuits are printed on the dielectric skins.

10. A vehicle comprising:
a body having an opening therein;
a variable inclination continuous transverse stub (VICTS) antenna having a central opening, said VICTS antenna disposed in the opening of said body, a plurality of CTS subarrays, a slot plate disposed over said plurality of CTS subarrays and rotatable with respect to a surface of said CTS subarrays, and a plurality of power dividers coupled to said CTS subarrays;
an optical phased array (OPA) disposed in the central opening of said VICTS antenna; and
a polarizer disposed over said VICTS antenna, said polarizer having an opening therein to expose the OPA.

11. The vehicle of claim 10 wherein said body is one of:
a fuselage;
a reentry vehicle;
a missile;
a portion of an aircraft;
a portion of a ship; and
a portion of a ground vehicle.

12. The vehicle of claim 11 further comprising an integrated radome disposed over said VICTS antenna and said OPA and having a shape which is conformal to the body of the vehicle.

13. The vehicle of claim 12 wherein said integrated radome comprises an RF radome portion and an optical window portion.

14. The vehicle of claim 13 wherein said RF radome portion is disposed about said an optical window portion.

15. The vehicle of claim 10 wherein said plurality of CTS subarrays comprise four subarrays surrounding the OPA.

16. The vehicle of claim 15 wherein at least one of said CTS subarrays has six slots and at least one of said subarrays has nine slots.

17. The vehicle of claim 10 wherein said slot plate comprises a tapered corrugated surface having a shape selected to slow down a parallel plate wave and to increase coupling to radiated slots.

18. The antenna of claim 10 further comprising stubs added to improve impedance matching.

19. The vehicle of claim 10 wherein said polarizer comprises:
   a foam layer and two skin layers; and
   meanderline circuits printed on the inside surface of each of the said skin layer.

20. The vehicle of claim 19 wherein said polarizer is disposed with respect to said slots such that a centerline of said meanderlines is disposed at an angle of about 45 degrees with respect to said slots.

21. The vehicle of claim 19 wherein said polarizer comprises dielectric skins and said meanderline circuits are printed on the dielectric skins.

22. The vehicle of claim 10 wherein said plurality of power dividers comprise:
   a 1:4 power divider;
   two 1:6 power dividers; and
   two 1:9 power dividers.

* * * * *